United States Patent [19]
Meijer et al.

[11] 4,439,169
[45] Mar. 27, 1984

[54] PRESSURE CONTAINMENT DEVICE

[75] Inventors: Roelf J. Meijer; Robert J. Brown; Benjamin Ziph, all of Ann Arbor, Mich.

[73] Assignee: Stirling Thermal Motors, Inc., Ann Arbor, Mich.

[21] Appl. No.: 405,750

[22] Filed: Aug. 6, 1982

[51] Int. Cl.³ ............................................. F16C 35/02
[52] U.S. Cl. .................................... 464/170; 464/178
[58] Field of Search ................ 464/170, 178; 384/152, 384/420

[56] References Cited

PUBLICATIONS

"Evaluation of the Potential of the Stirling Engine for Heavy Duty Application", Final Report by Meizer and Ziph, Contract No. NA53-22226, May 1981.
A Variable Angle Wobble Plate Drive for a Stroke Controlled Stirling Engine, American Chemical Society, Paper 799258, 1979.
Conceptual Design of a Variable Displacement Stirling Engine for Automotive Propulsion, R. J. Meijer and A. P. J. Michels, S.A.E., Paper 789351, Oct. 1978.

Primary Examiner—Stuart S. Levy
Assistant Examiner—Dao Van Huynh

[57] ABSTRACT

The pressure containment device for containing pressurized gas within a Stirling engine is characterized by enclosing a drive mechanism housing with a cylindrical pressure hull having first and second ends whereby a portion of the drive mechanism housing extends through the first end of the pressure hull and the second end thereof, is rigidly connected to the drive mechanism housing. An o-ring is used to seal the connection where the drive mechanism housing extends through the first end of the pressure hull to allow small axial and radial relative motions therebetween. An output shaft extends along the axis of revolution of the pressure hull and is supported by front and rear main bearings and a thrust bearing, all rigidly connected to the drive mechanism housing. A rotating shaft seal, also connected to the drive mechanism housing, prevents pressurized gas from escaping along the output shaft.

4 Claims, 2 Drawing Figures

PRESSURE CONTAINMENT DEVICE

BACKGROUND OF THE INVENTION

Field of the Invention

This invention pertains to Stirling engines wherein a swashplate connected to an output drive shaft is driven by a crosshead connected to pistons located within a drive mechanism housing.

SUMMARY OF THE INVENTION

The pressure containment device for containing pressurized gas within a Stirling engine, according to the present invention, is characterized by enclosing a drive mechanism housing with a cylindrical pressure hull having first and second ends whereby a portion of the drive mechanism housing, containing an output shaft, extends through the first end of the pressure hull and the second end thereof is rigidly connected to the drive mechanism housing. The output shaft is supported by front and rear main bearings and a thrust bearing, all rigidly connected to the drive mechanism housing such that the pressure hull can be removed from the engine without removing the thrust bearing.

An o-ring is used to seal the connection where the drive mechanism housing extends through the first end of the pressure hull to allow slight axial and radial relative motions therebetween, caused by expansion of the pressure hull due to the pressure contained thereby. A rotating shaft seal, also connected to the drive mechanism housing, prevents pressurized gas from escaping along the output shaft. Close mounting tolerances are provided by locating the rotating shaft seal within the drive mechanism housing, unlike other Stirling engines, wherein the rotating shaft seal is connected to the pressure hull and therefore its mounting fit and hence, its sealing integrity is adversely affected by expansion of the pressure hull caused by the gas pressure contained therein.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
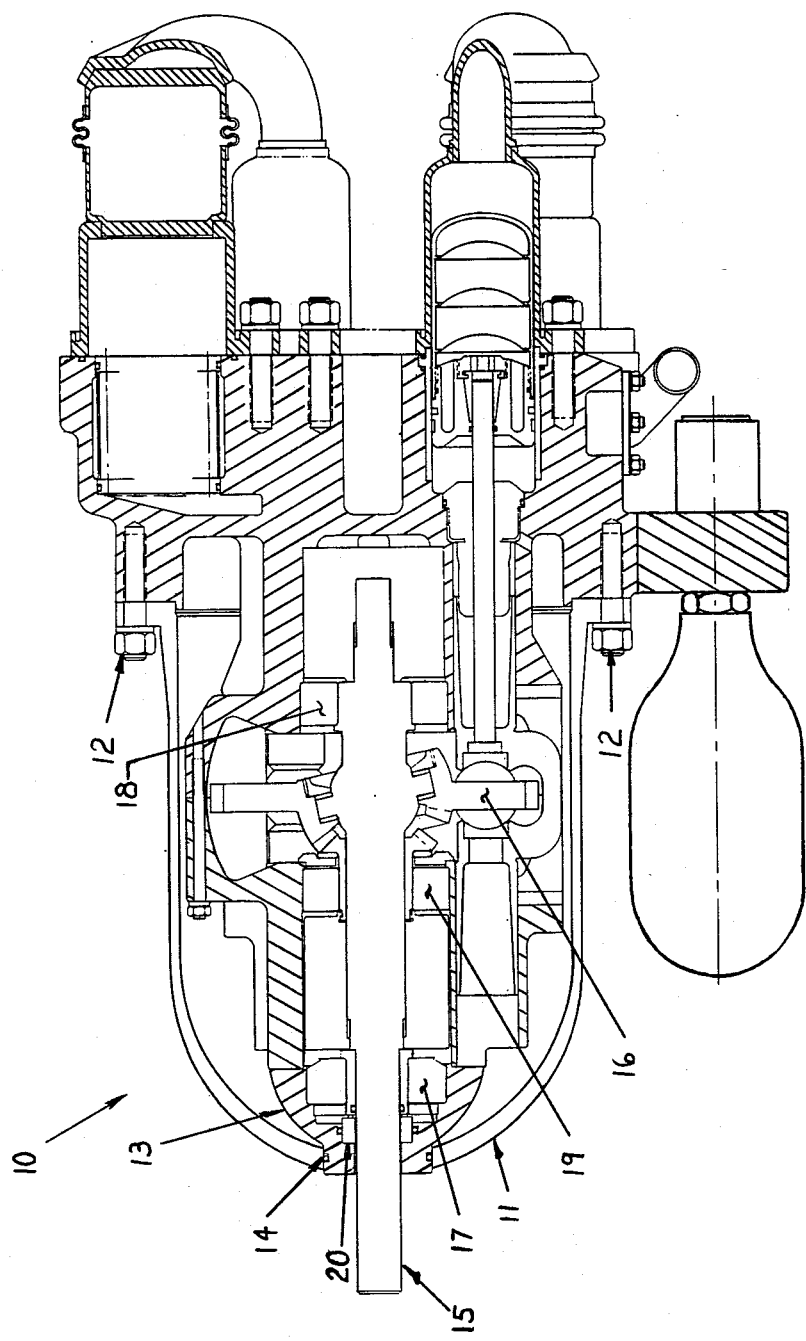
FIG. 1 shows a longitudinal cross section of the Stirling engine.

A Stirling engine with a pressure containment device affixed thereto is indicated generally at reference numeral 10 in FIG. 1. Pressure hull 11 encloses drive mechanism housing 13 to the extent shown in FIG. 1 and is substantially cylindrically shaped having a hemispherically shaped first end and an open second end. A plurality of fasteners 12 extend through holes provided therefor in an annular flange structurally integral with the cylindrical surface of the second end of pressure hull 11 to rigidly fasten pressure hull 11 to drive mechanism housing 13.

Figure 2:
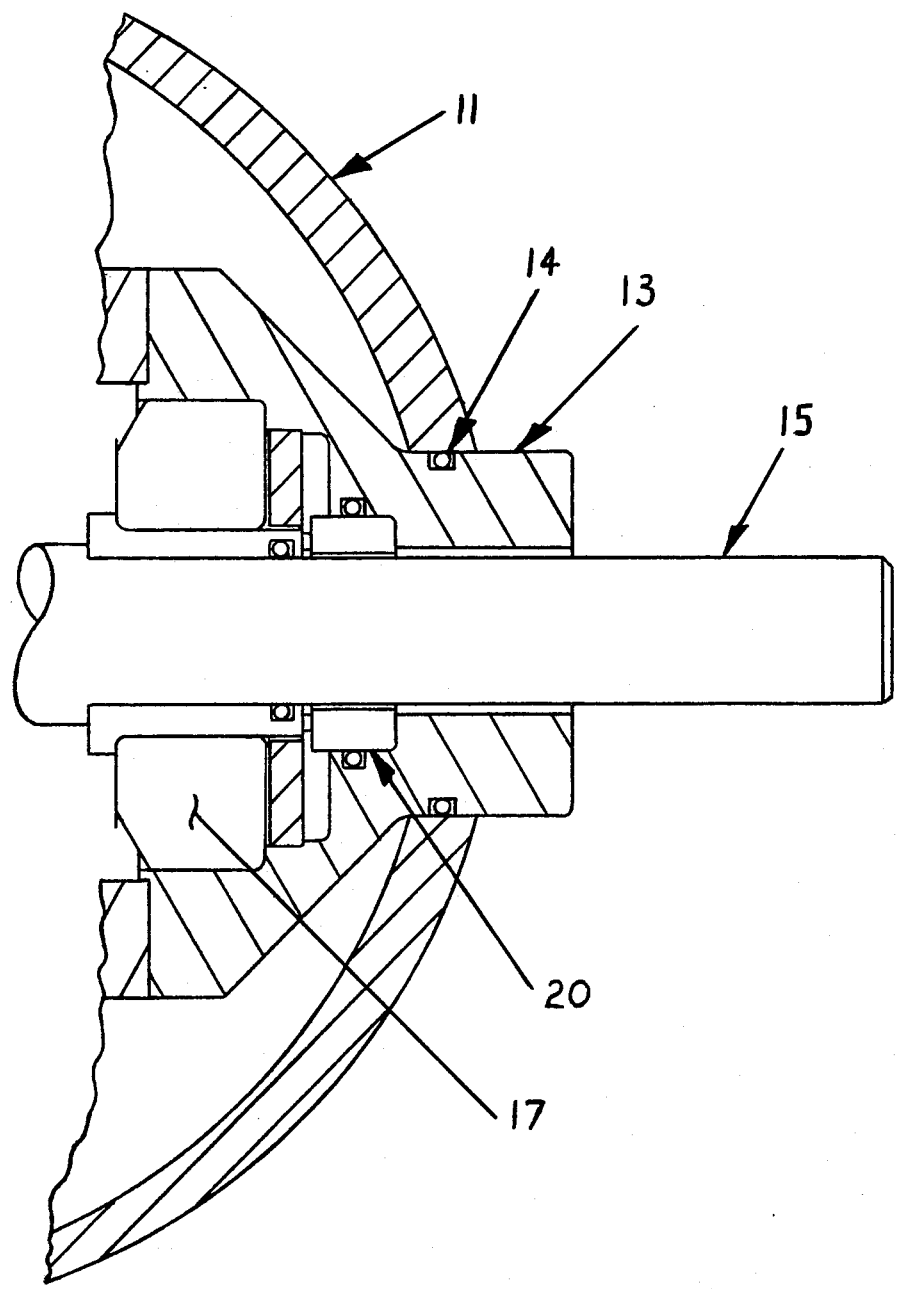
FIG. 2 is an enlarged portion of the longitudinal cross section according to FIG. 1.

A portion of drive mechanism housing 13 extends through a hole provided therefor in the first end of pressure hull 11, and o-ring 14 provided a seal therebetween, as FIG. 2 illustrates. O-ring 14 allows pressure hull 11 to slightly move axially and radially relative to drive mechanism housing 13 while maintaining sealing integrity.

Output shaft 15 is connected to swashplate 16 and coincides with the axis of revolution of pressure hull 11. Output shaft 15 is supported by drive mechanism housing 13 by means of thrust bearing 17 and front and rear main bearings 18 and 19 respectively, rigidly connected thereto. A rotating shaft seal 20 creates a dynamic sealing surface between output shaft 15 and drive mechanism housing 13 to prevent gas pressure from escaping along output shaft 15.

An object of the present invention is to provide pressure containment means for a Stirling engine whereby such means can be removed from the engine without removing the thrust bearing 17. This feature is particularly useful during assembly of the engine whereby after installation of all drive mechanism components including swashplate 16, output shaft 15, main bearings 18 and 19 and thrust bearing 17 into drive mechanism housing 13, the rotating components can be tested by rotatively driving such components with external means such as an electric motor. This feature allows inspection of alignment of the drive mechanism, testing of integral lubricating system, and observing swashplate 16 angle changes.

The gas pressure contained by the pressure containment device is up to 11 MPa. At such pressure, pressure hull 11 will expand slightly in axial and radial directions. O-ring 14, being a static seal, will allow slight axial and radial relative motion between pressure hull 11 and drive mechanism housing 13 in a position within pressure hull 11, whereat high pressure surrounds the drive mechanism housing 13, as FIG. 2 shows. The advantage gained thereby is that close radial and axial tolerances in the mounting position of rotating shaft seal 20 required to maintain the integrity of the dynamic sealing surface are provided unlike other Stirling engines, whereby the rotating shaft seal is connected to the pressure hull and therefore its mounting fit and hence, its sealing integrity is adversely affected by expansion of the pressure hull caused by the gas contained therein.

What is claimed is:

1. A device for containment of drive mechanism housing pressure in a Stirling engine having a variable swashplate drive mechanism connected to an output shaft comprising: a rotating shaft seal rigidly connected to said drive mechanism housing and slidably connected to said output shaft located therein, such that a seal is formed therebetween; a thrust bearing for supporting said output shaft rigidly connected to said drive mechanism housing; and a pressure hull enclosing said drive mechanism housing having a first end slidably connected to said drive mechanism housing extending therethrough and a second end rigidly connected to said drive mechanism housing.

2. A pressure containment device as recited in claim 1, wherein said pressure hull is substantially cylindrically shaped, having the first end hemispherically shaped and the second end open.

3. A pressure containment device as recited in claim 2, wherein said output shaft extends along the axis of revolution of said pressure hull.

4. A pressure containment device as recited in claim 3, wherein the slidable connection between the hemispherical first end of said pressure hull and the portion of said drive mechanism housing extending therethrough comprise an o-ring for allowing small axial and radial relative motion therebetween.

* * * * *